United States Patent [19]

Ranniger

[11] Patent Number: 5,766,066
[45] Date of Patent: Jun. 16, 1998

[54] SKINNING MACHINE

[76] Inventor: Richard L. Ranniger, 2256 Gentle Oaks, Fayetteville, Ark. 72703

[21] Appl. No.: 658,517

[22] Filed: Jun. 5, 1996

[51] Int. Cl.$^6$ .......................................................... A22B 5/16
[52] U.S. Cl. ............................................ 452/127; 452/125
[58] Field of Search .................................. 452/125, 127; 30/355, 357, 329

[56] References Cited

U.S. PATENT DOCUMENTS

| | | |
|---|---|---|
| 3,360,026 | 12/1967 | Schill . |
| 3,681,846 | 8/1972 | Gerber ........................................ 30/355 |
| 3,728,792 | 4/1973 | Gault ........................................... 30/355 |
| 4,071,923 | 2/1978 | Smith . |
| 4,119,004 | 10/1978 | Ludwig ....................................... 30/355 |
| 4,123,959 | 11/1978 | Schill . |
| 4,188,870 | 2/1980 | Schill . |
| 4,203,179 | 5/1980 | Braeger . |
| 4,222,152 | 9/1980 | Braeger . |
| 4,292,710 | 10/1981 | Townsend . |
| 4,340,995 | 7/1982 | Braeger . |
| 4,408,519 | 10/1983 | Schill . |
| 4,466,344 | 8/1984 | Schill . |
| 4,549,458 | 10/1985 | Townsend . |
| 4,606,093 | 8/1986 | Townsend ................................... 427/127 |
| 4,649,604 | 3/1987 | Braeger . |
| 4,670,943 | 6/1987 | Townsend . |
| 4,688,297 | 8/1987 | Bartels . |
| 4,730,368 | 3/1988 | Townsend . |
| 4,761,938 | 8/1988 | Townsend . |
| 4,793,026 | 12/1988 | Braeger et al. ............................ 452/127 |
| 4,811,459 | 3/1989 | Townsend . |
| 4,835,817 | 6/1989 | Jürs . |
| 4,856,143 | 8/1989 | Callsen et al. . |
| 4,882,811 | 11/1989 | Ewing . |
| 4,901,399 | 2/1990 | Hegelmann . |
| 4,920,875 | 5/1990 | Schill . |
| 4,993,114 | 2/1991 | Meyer et al. . |
| 5,011,454 | 4/1991 | Townsend ................................... 452/125 |
| 5,021,023 | 6/1991 | Braeger . |
| 5,071,388 | 12/1991 | Lindert et al. . |
| 5,090,941 | 2/1992 | Dechow . |
| 5,098,337 | 3/1992 | Landt et al. . |
| 5,100,067 | 3/1992 | Konig et al. . |
| 5,106,335 | 4/1992 | Behnk et al. . |
| 5,122,091 | 6/1992 | Townsend . |
| 5,149,297 | 9/1992 | Braeger et al. . |
| 5,203,736 | 4/1993 | Schulte et al. . |
| 5,211,097 | 5/1993 | Grasselli ................................... 452/127 |
| 5,273,485 | 12/1993 | Hegelmann et al. . |
| 5,288,264 | 2/1994 | Braeger .................................... 452/127 |
| 5,350,334 | 9/1994 | Holms . |
| 5,354,232 | 10/1994 | Pontow . |

*Primary Examiner*—Willis Little
*Attorney, Agent, or Firm*—Shook, Hardy & Bacon L.L.P.

[57] ABSTRACT

The present invention is directed to a automatic skinning machine. The automatic skinning machine includes a blade holder with a plurality of indentations disposed thereon. The cutting blade is adopted to be positioned adjacent to blade holder such that the cutting edge is recessed behind the leading edge of the blade holder and generally extends across each of the indentations formed on the leading edge. The invention further includes attaching apertures formed only on the bottom surface of the blade holder such that crevices and cracks which could lead to contamination are not exposed to product passing over the blade holder. The invention further includes the use of locking pins in conjunction with the apertures formed on the bottom surface of the blade holder such that the blade can be easily held in position. The invention further includes a camming structure for automatically moving the cutting shoe of the device between an initial position and a skinning position. The cutting shoe is further mounted in a floating manner such that it can self adjust to different thicknesses of product flowing therethrough. Further, a quick release device is provided for easily and quickly removing the cutting shoe from its skinning orientation to a cleaning orientation and then exactly back to the same skinning orientation. An overhead transport mechanism is provided for ensuring that the product is adequately engaged by the skinning mechanisms and adequately discharged from the machine. A cleaning mechanism is also provided for adequately cleaning the gripping roller associated with the skinning mechanism of the device.

7 Claims, 8 Drawing Sheets

SKINNING MACHINE

BACKGROUND OF THE INVENTION

The present invention is directed to a machine for automatically removing skin from meat, poultry and fish products.

Automatic skinning machines adapted to remove skin or membrane from meat, poultry or fish products have long been in existence. These skinning machines typically include a frame structure. The frame structure includes a product-supporting surface and an elongated blade mounted over a gripping roller have a plurality of teeth. The blade is held to a shoe means by a blade-holding structure. The shoe has an interior arcuate surface which is complementary in shape to the outer periphery of the teeth of the gripping roller. The blade extends outwardly beyond the blade holder generally above the gripping roller such that a small space exists between the blade and the roller. As the product is moved against the blade, the skin of the product is severed therefrom and is passed between the gripping roller and the shoe. The skinned product passes above and over the blade. Having only a blade with a sharpened edge often results in damage to products skinned. More specifically, some products have a "silver skin" or membrane positioned between the skin layer and the muscle. It is preferable for this membrane to remain on the muscle for consumer sales purposes. If skin is missing along one portion of the product, the sharp blade will slice through the membrane, thus decreasing the value of the product. Additionally, oftentimes a sharp blade will result in skin being left on a product if the product has a large number of deformities. More specifically, if there are upward undulations within the product, the sharp blade will tend to slice through the skin as opposed to pulling the skin from the muscle. Thus, skin can remain on areas of the product after it has been passed through the skinning machine.

In order to overcome some of the problems discussed above, efforts have been made in the past to dull the sharpened cutting edge of the blade. As this is done, a pinch point is created between the gripping roller and the front edge of the blade so that the skin is generally pulled from the muscle instead of being sliced from the muscle. This sometimes proves acceptable in removing skin while leaving the thin membrane or "silver skin" mentioned above, and also can allow better removal of the skin from the product.

Problems, however, are associated with having a dull cutting blade. More specifically, in some types of products, such as chicken and turkey, there are sinuous fibers or tissues connecting the skin to the muscle. This connective tissue is very sinewy and tends to maintain its attachment to both the skin and muscle as the skin is being pulled off the muscle. Thus, the fibers of the connective tissue oftentimes will still be attached to the product on top of the cutting shoe and to the skin being conveyed between the gripping roller and the cutting shoe. As is apparent, these fibers can cause clogging between the cutting shoe and the gripping roller and, thus, drastically decrease the efficiency of the automatic skinning machine.

Other problems with prior automatic skinning machines revolve around the possibility of contamination resulting from structures used to attach the cutting blade to the cutting shoe. More specifically, the blade-holding devices of current skinning machines often have apertures opening to the top surface which align with apertures in the cutting shoe. The cutting blade is clamped between the blade-holding plate and the cutting shoe and is held in position by pins or bolts which extend from the top surface of the holding plate through the apertures therein and into the apertures within the shoe. As is apparent, because the apertures in the holding plate extend to the top surface of the plate and product passes over the top surface of the plate, it is inherent that meat particles may accumulate in the crevices and cracks formed by these upper exposed apertures. As this happens and meat particles begin to decay therein, contamination of subsequent product passing over the blade-holding plate becomes inevitable.

Other problems associated with prior art skinning machines pertain to the adjustment of the clearance between the cutting blade and the gripping roller and to allowing the cutting shoe to move in response to oversized portions of skin passing between the gripping roller and the cutting shoe. Current skinning technology utilizes machine spacers or cartridges to adjust the clearance between the blade and the gripping wheel. These types of structures make fine adjustment difficult and time-consuming. Further, these structures do not allow the blade relationship to be easily and accurately adjusted to accommodate different skinning applications and varying skin thickness. Still further, prior art structures do not adequately prevent clogging in the space between the gripping roller and the cutting shoe. More specifically, current automatic skinning machines use coil springs to supply downward pressure to the cutting shoe. The resulting pressure vector applied to the cutting shoe is directed in a downward linear plane. Therefore, as a larger piece of skin passes through one side of the elongated cutting blade between the cutting shoe and the gripping roller, the entire cutting shoe assembly raises along its entire width, thus creating problems with the other end of the cutting blade where skin of normal thickness is being removed. As is apparent, this can result in inefficient and ineffective skinning of product.

Additionally, it is often difficult to skin products having a thick skin in current automatic skinning machines. More specifically, it is difficult when the product first engages the blade and cutting shoe for the thick skin to be grabbed or pinched between the blade and the gripping roller. This can result in the product only being partially skinned, or, if the skin is never pinched between the shoe and the gripping roller, the product not being skinned at all.

Additional problems relating to prior art skinning machines revolved around the necessity of cleaning between the gripping roller and the cutting shoe. In such prior machines, the shoe is often separated entirely from the framework of the machine to clean these areas. Every time this is done, it is necessary to reposition the shoe and blade in the exact desired skinning location above the gripping wheel. As is apparent, oftentimes the exact repositioning of the blade is not accomplished, and if it is accomplished, it requires a great amount of time and effort on the part of the machine user.

Current technology for automatic skinning machines utilizes a plurality of feed rollers mounted on a single shaft at a location that is generally above the cutting shoe and the gripping roller. These driven rollers serve to help propel the product across the blade. More specifically, they engage the upper surface of the product while the lower surface of the product is skinned. These rollers are mounted on a single shaft are also supported by a spring-loaded frame so that the rollers move as a single unit. If there are a plurality of products moving under the bank of rollers at the same time, the rollers are at the height of the thickest product. Thus, some of the smaller products may not be adequately propelled across the cutting shoe. Further, oftentimes the single bank of rollers does not adequately discharge the product from on top of the cutting shoe. Thus, product may be stuck directly behind the cutting shoe and on the other side of the feed rollers. The only way this product is moved forwardly is when other product pushes it forward as it is propelled across the cutting shoe and the feed roller. As is apparent, this is not a very effective way of moving product through a device and oftentimes results in clogging or jamming of the machine.

Cleaning of the gripping roller associated with the cutting shoe is also a major concern in automatic skinning machines. Prior structures used to clean such rollers involve a moving spindle on a threaded rod, such spindle having an air nozzle associated therewith. As the rod is rotated, the spindle moves back and forth along the rod, thus directing a jet of air back and forth along the gripping roller to attempt to remove skin and other particles therefrom. This type of cleaning system involves complex moving parts and oftentimes has to be repaired due to clogging or part failure.

Therefore, a skinning machine is needed which alleviates the disadvantages and drawbacks of prior art skinning machines discussed above.

SUMMARY OF THE INVENTION

One object of the present invention is to provide a blade holder which allows positioning of a cutting blade such that skin from products that have a layer of sinewy connective tissue between the skin and the muscle can be easily and effectively removed without clogging or jamming of the gripping roller.

An additional object of the present invention is to prevent a blade holder from damaging the membrane or silver skin surrounding the muscle of some products during the skinning process, such damage oftentimes resulting in a decrease in value of the product.

A further object of the present invention is to provide a blade holder which minimizes the number of cracks and crevices to decrease the possibility of product contamination.

A still further object of the present invention is to provide a blade-holding structure for a skinning machine which allows easy and accurate horizontal adjustment of the cutting blade.

Another object of the present invention is to provide a shoe assembly for a skinning machine which ensures that if a product with a thick skin is used, the skin is adequately pinched and thereafter maintained between the cutting shoe assembly and the gripping roller.

An additional object of the present invention is to provide a shoe assembly for a skinning machine which can generally float above the gripping roller in response to skin of various thicknesses being conveyed between the skinning roller and the shoe, such floating shoe assembly allowing movement and adjustment of the shoe in response to the various skin heights in both a side-to-side and backward-forward direction.

A further object of the present invention is to provide a quick release assembly for the shoe assembly of a skinning machine wherein the cutting blade of the shoe assembly can be easily removed from its operative skinning position to allow cleaning of the space between the gripping roller and the shoe, and can be effectively and accurately returned to the exact same skinning position after it has been cleaned.

A still further object of the present invention is to provide an overhead transport mechanism for a skinning machine which effectively and efficiently ensures that product being conveyed over the shoe is adequately removed from the area surrounding the shoe.

An additional object of the present invention is to provide an overhead transport mechanism which is individually adjustable across the width of the skinning machine such that a variety of products of different heights passing over the cutting shoe at the same time will be effectively and individually propelled from on top of the cutting shoe by the tractor mechanism.

A still further object of the present invention is to provide a cleaning mechanism for a skinning machine wherein cleaning media can be effectively distributed in a sequential fashion across the length of the gripping roller as the gripping roller rotates without the need for high maintenance complex moving parts in the skinning machine.

According to the present invention, the foregoing and other objects are obtained by a blade holder for a skinning machine having an elongated body with an upper surface and a lower surface. The upper surface slopes downwardly to form a leading edge with a lower surface. The leading edge has a plurality of indentations formed there along and the cutting blade is adapted to be positioned adjacent the elongated body so that the blade cutting edge is recessed behind the leading edge of the body and extends across at least a portion of each indentation.

In accordance with another aspect of the invention, a blade holder for a skinning machine is provided with an elongated body having an upper and lower surface. The lower surface of the body has at least one cylindrical recess formed therein and extends upwardly toward the upper surface, but does not extend to the upper surface. Each recess has a horizontally extending channel extending to one side and formed in the elongated body. The channel has a slot that connects it spatially to the lower surface of the elongated body. The width of the recess and the width of the channel correspond generally to the width of the oversized head of a locking pin that is used to attach the body to a cutting shoe. The width of the slot corresponds generally to the width of a neck that separates the body of the pin from the oversized head of the pin.

According to a further aspect of the present invention, an attaching and adjusting assembly for connecting a cutting blade to a skinning machine includes a blade holder with an upper surface and a lower surface. The lower surface of the holder has an elongated shelf for receiving a blade. The lower surface also has at least one cylindrical recess formed therein and extending upwardly towards the upper surface, but not extending all the way to the upper surface. The recess has a horizontally extending channel extending to one side, the channel having a slot that connects the channel spatially to the lower surface of the blade holder. A pressure shoe has an upper surface and is adapted to operate with a gripping roller. The upper surface of the pressure shoe engages the lower surface of the holder to hold the blade in place. The shoe has an angled attaching bore extending from the shoe upper surface downwardly and a securing bore extending generally perpendicular to the attaching bore. A locking pin is used to secure the blade holder to the pressure shoe. The locking pin has an elongated body and oversized head portion separated from the body by a reduced diameter neck. The width of the head of the locking pin corresponds generally with the width of the recess and the width of the channel. The width of the neck of the pin corresponds generally to the width of the slot. The holder body is attached to the pin by positioning the head of the pin into the recess and sliding the head into the channel and the neck into the slot so that the head is connected to the holder body. The pin body also has a laterally extending securing aperture formed therein. The pin body is then disposed in the attaching bore of the shoe and a locking bolt is positioned in the securing bore and extends into the securing aperture of the pin body. The locking bolt is moved within the securing bore such that movement of the bolt toward the pin results in the holder body being tightened to the shoe.

In accordance with a still further aspect of the invention, a shoe assembly for a skinning machine has a shoe configured to operate in conjunction with a gripping roller to create a pinch point therewith. A blade holder is attached to the shoe and a pair of end plates are operably connected to the skinning machine and are each associated with one end of the blade holder. A camming means allows movement of the shoe with respect to the end plates so that the shoe can be positioned between an initial position to trap the skin of the product being skinned and the skinning position to perform skinning of the product. A biasing means biases the shoe to its initial position and the shoe moves to its skinning position as the product passes over the blade holder.

In accordance with an additional aspect of the present invention, a floating shoe assembly for a skinning machine has a shoe configured to operate in conjunction with the gripping roller to create a pinch point therewith. At least one end plate is operably connected to the shoe and the end plate has a body and a forwardly extending arm. The arm has a generally horizontal upper surface and a generally horizontal lower surface. The body also has an angular abutting surface sloping away from the arm. A mounting block is attached to the frame of the skinning machine and has a generally horizontal support ledge and an angular supporting ledge. A biasing means biases the end plate so that the arm lower surface is biased toward the horizontal supporting ledge, and the angular abutting surface of the end plate is biased toward the angular supporting ledge of the mounting plate. As skin passes between the gripping roller and the shoe, the shoe can float above the horizontal supporting ledge and the angular supporting ledge.

In accordance with a further aspect of the invention, a quick release assembly for moving a cutting shoe assembly of a skinning machine includes at least one sliding block adapted to be attached to the shoe assembly. The sliding block has a generally flat horizontal upper surface and generally flat horizontal lower surface. A guide block has a channel formed therein. The channel has a generally flat horizontal upper surface and a generally flat horizontal lower surface. The sliding block is slidably received in the channel so that the sliding block upper surface engages and slides along the channel upper surface and the slide block lower surface engages and slides along the channel lower surface so that the shoe assembly can be moved between its skinning position and a cleaning position.

In accordance with a still further aspect of the invention, an overhead transport mechanism for a skinning machine includes a frame mounted to the skinning machine and a feed gear rotatably and drivingly mounted to the frame at a location above the shoe assembly of the skinning machine. The feed gear guides the product to be skinned into contact with the shoe assembly and the gripping roller. It further includes a follower gear rotatably and drivingly mounted to the frame to pull the product after it exits the feed gear and to discharge the product from the machine.

In accordance with another aspect of the invention, an overhead transport mechanism for a skinning machine has a frame pivotally mounted to the skinning machine at an intermediate region of the frame so that a first section of the frame extends one direction from the intermediate region and a second section of the frame extends the other direction from the intermediate region. A feed gear is rotatably and drivingly mounted to the first section of the frame at a location above the shoe assembly. The feed gear guides the product to be skinned into contact with the shoe assembly and the gripping roller. A biasing means biases the feed gear toward the shoe assembly and gripping roller. The biasing means is operably coupled to the second section of the frame.

1. In accordance with a further aspect of the invention, a cleaning system for a skinning machine includes a discharge manifold having a fluid reservoir, a longitudinally extending bore, and a plurality of discharge ports. The reservoir is in communication with the bore and adapted to be connected to a fluid supply. The discharge ports are adapted to spray fluid onto the gripping roller of the skinning machine. A rotating elongated roller is rotatably disposed in the bore. The roller has a plurality of passages disposed therein. Each of the passages is associated with one of the discharge ports such that, when the passage aligns with the discharge port and the reservoir, fluid is conveyed to the discharge port from the reservoir. The passages are spaced circumferentially about the roller to provide a predetermined pattern of fluid onto the gripping roller through the discharge ports.

Additional objects, advantages, and novel features of the invention will be set forth in part in the description which follows and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE PREFERRED EMBODIMENTS

Figure 1:
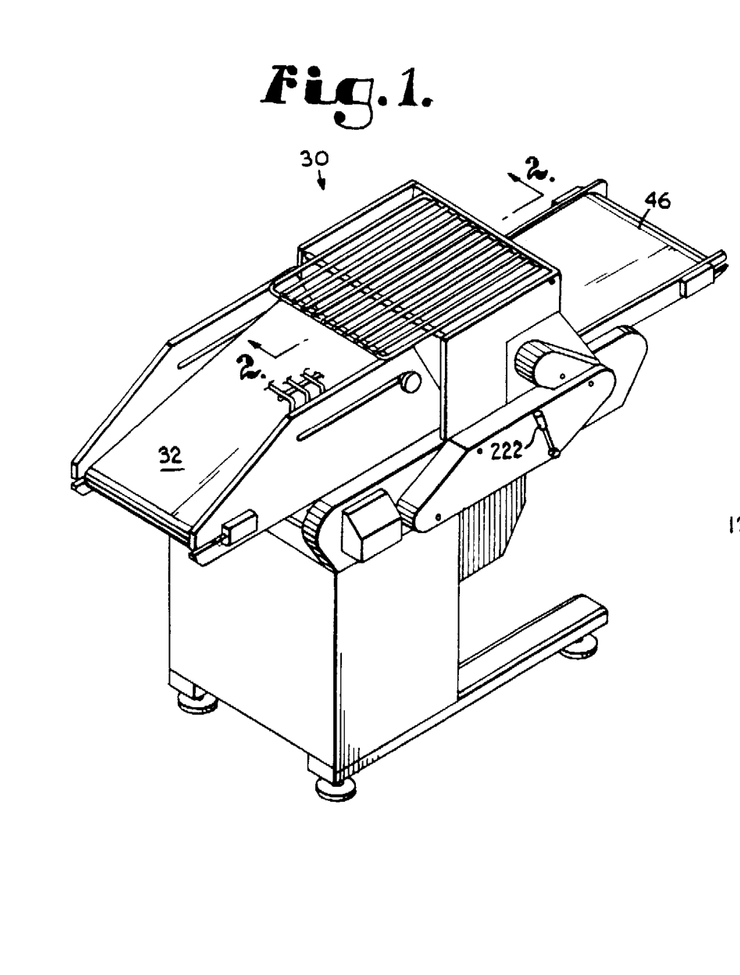
FIG. 1 is an upper front perspective view showing an automatic skinning machine embodying the present invention, parts being broken away to show details of construction.
Figure 2:
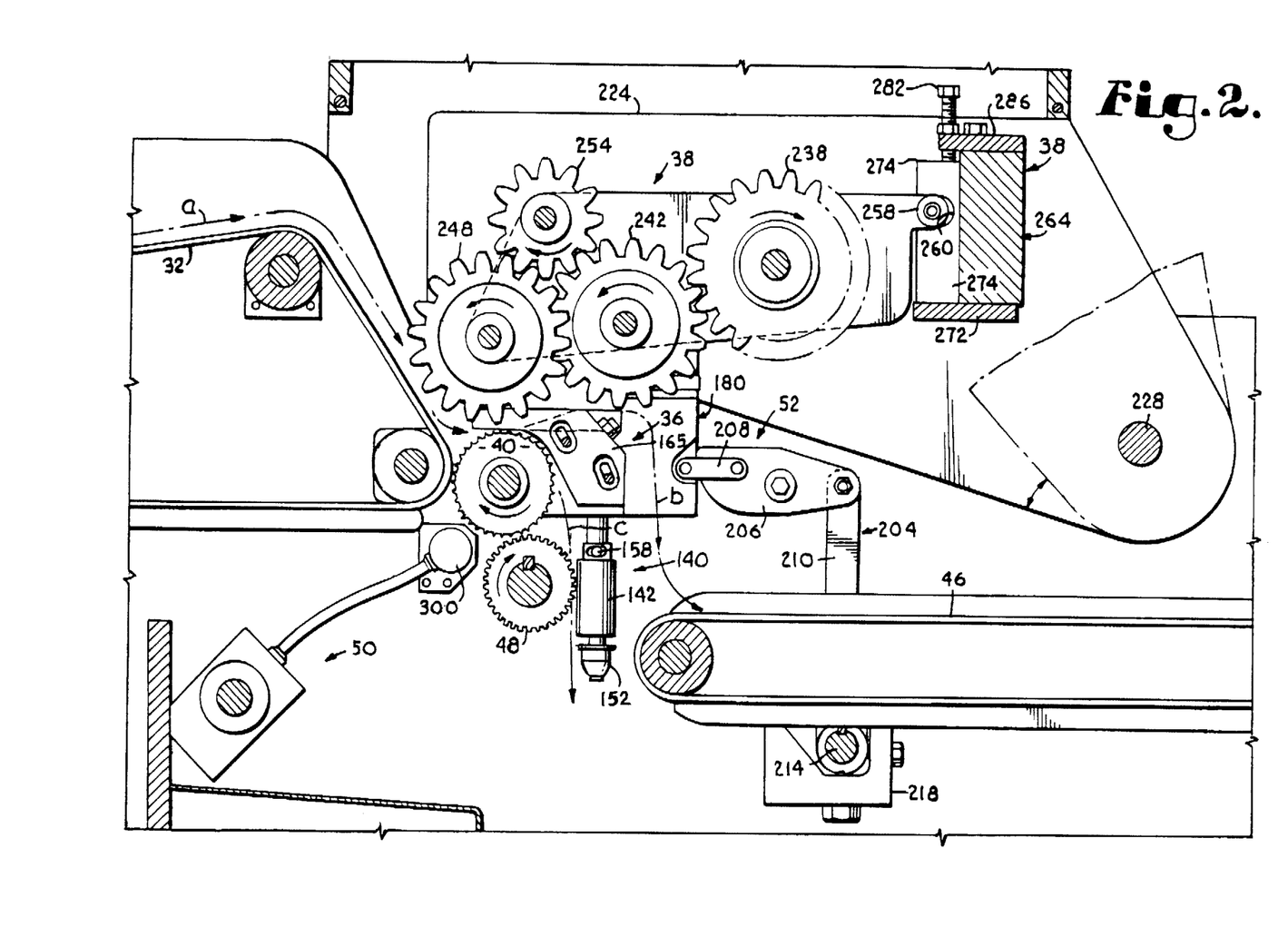
FIG. 2 is a detailed cross-sectional view taken generally along line 2—2 of FIG. 1 with arrows indicating the rotation of particular structures, and arrows also indicating the path of product through the machine, an alternative rotatable position for the tractor mechanism shown in phantom lines.

Turning now to the drawings in greater detail, and initially to FIGS. 1 and 2, an automatic skinning machine embodying the present invention is designated broadly by the reference numeral 30. Machine 30 has an infeed conveyor 32 for transporting the product to be skinned into the operative skinning mechanisms of the machine. The inflow of the product is indicated by the arrow labeled "a". The operative skinning mechanism of machine 30 includes a pressure shoe assembly 36, an overhead transport mechanism 38, and a gripping roller 40.

Figure 9:
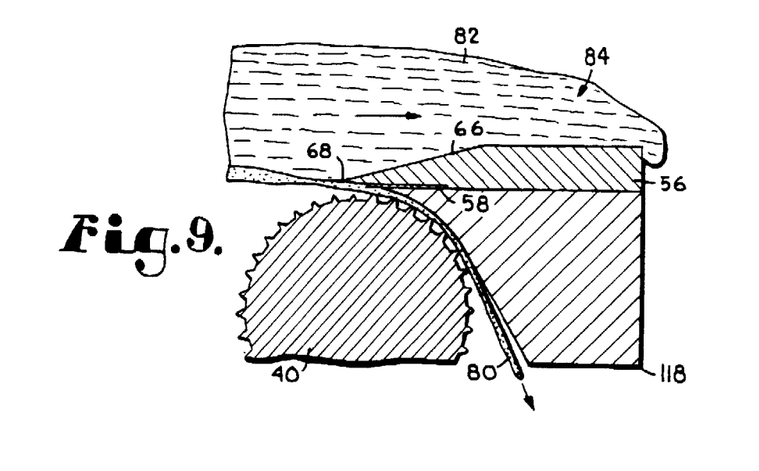
FIG. 9 is a side elevational view similar to FIG. 8 with the blade in a bevel up position; such that only the skin is removed from the muscle while the fat remains with the muscle.
Figures 19, 20, 21:
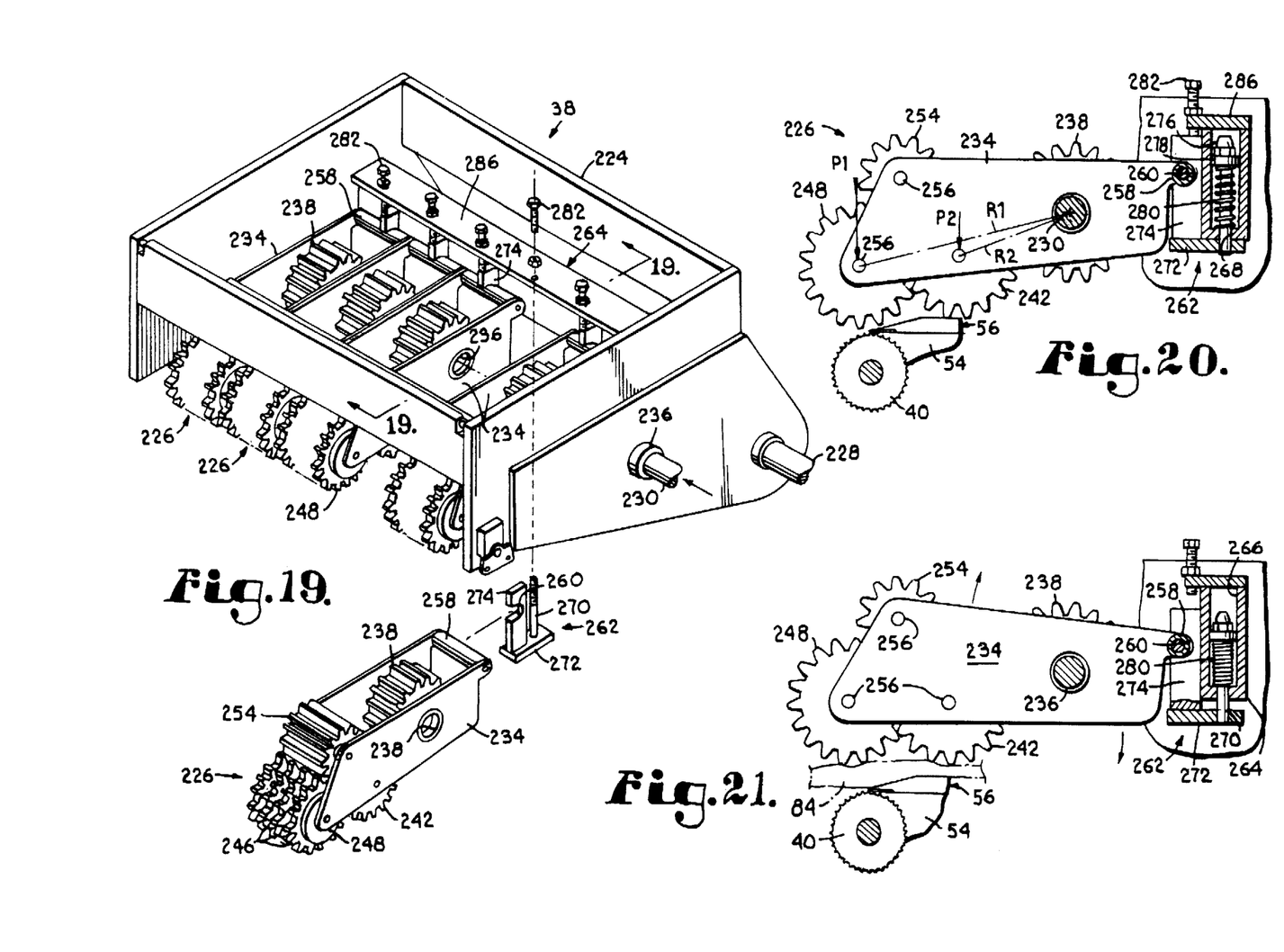
FIG. 19 is a top perspective and partially exploded view of the overhead transport mechanism of the automatic skinning machine.
FIG. 20 is a cross-sectional view taken generally along line 20—20 of FIG. 18 and showing an individual tractor mechanism unit.
FIG. 21 is a view similar to FIG. 20 showing the rotation of an individual tractor mechanism unit in response to product flowing over the pressure shoe.

The product as it flows through the machine is skinned by the pinching of the skin between pressure shoe assembly 36 and gripping roller 40 as generally shown in FIG. 9. Further, transport mechanism 38 helps ensure that the product is conveyed and adequately contacts pressure shoe assembly 36 as shown in FIG. 21. In FIG. 2, the flow of the skinned product is indicated by directional arrow "b" and the flow of the skin that is stripped from the product as indicated by the arrow "c". The skinned product is ejected from its contact with pressure shoe assembly 36 by tractor mechanism 38 and drops onto outfeed conveyor 46 as indicated by arrow b. The skin is removed from gripping roller 40 by a stripping roller 48 and a cleaning mechanism 50. A pressure shoe positioning structure 52 is provided to allow removal of shoe assembly 36 from its operating position for cleaning between the shoe and gripping roller 40. The above description is of the general flow of the product through machine 30. The inventive nature of the structures of the machine will be hereafter described in detail.

PRESSURE SHOE ASSEMBLY AND BLADE HOLDER

Figure 3:
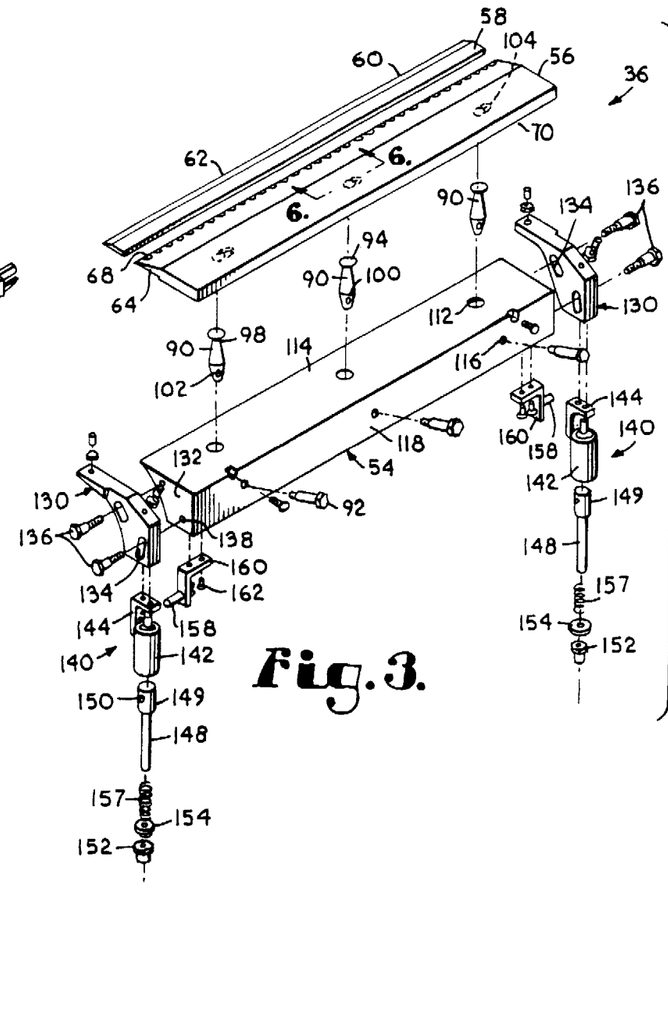
FIG. 3 is an exploded perspective view of the pressure shoe assembly and blade holder, according to the present invention.
Figure 4:
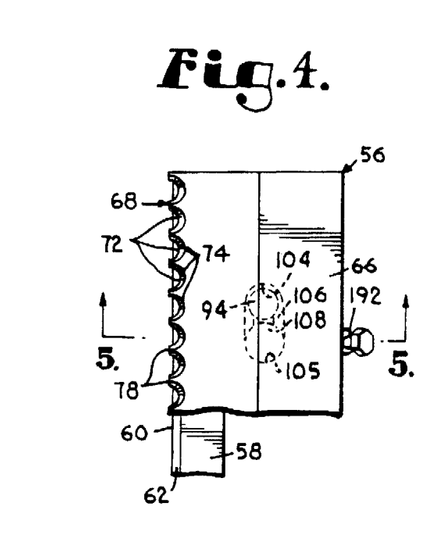
FIG. 4 is a partial top plan view of the blade holder shown in FIG. 3 with the cutting blade shown positioned such that its leading sharp edge is disposed behind the front edge of the blade holder.
Figure 5:
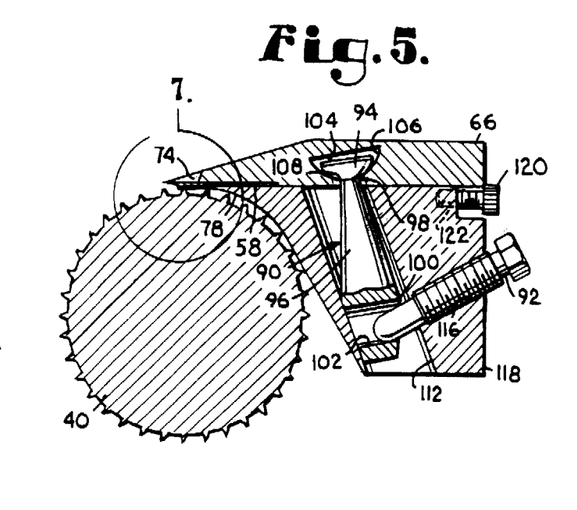
FIG. 5 is a detailed cross-sectional view taken generally along lines 5—5 of FIG. 4 and showing the attachment of the blade holder to the pressure shoe and the relationship between the gripping roller and the pressure shoe.
Figure 7:
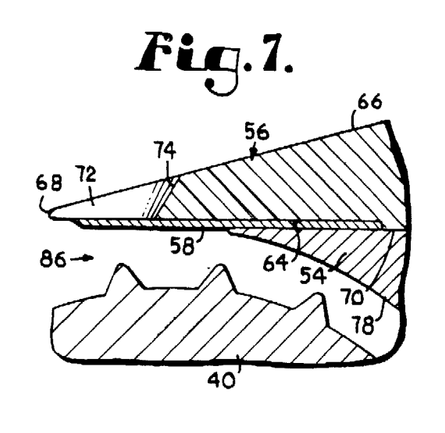
FIG. 7 is an enlarged fragmentary view of the area designated by the reference numeral 7 in FIG. 5 and showing the blade in a bevel down position.

With reference to FIG. 3, pressure shoe assembly 36 generally includes a pressure shoe 54, a blade holder 56, and a cutting blade 58. Blade 58 has a sharpened forward edge 60 formed by a bevel 62. Blade 58 is positioned in a recess 64 formed on a lower surface 70 of holder 56 and is held in its operative position by being clamped between holder 56 and the upper surface of shoe 54 as best shown in FIGS. 5 and 7. Blade holder 56 has a downwardly sloped upper surface 66 which forms a leading edge 68 with lower surface 70. Edge 68 has a plurality of semicircular indentations 72 formed therein as best shown in FIG. 4. Each indentation 72 has a beveled surface 74 which has a sharper downward angle than the angle of upper surface 66. Indentations 72 are spaced along edge 68 such that straight segments 76 are formed between the indentations. Segments 76 of edge 68 are dulled or rounded as best shown in FIG. 7.

When blade 58 is clamped between holder 56 and shoe 54, the sharpened edge 60 of blade 58 is positioned at a location that is behind leading edge 68 as best shown in FIGS. 4, 5, and 7. Thus, edge 60 extends partially across each indentation 70, such that edge 60 is visible in the indentations when the blade holder is viewed from the top as best shown in FIG. 4.

Pressure shoe 54 has a curved generally downward facing surface 78 which generally conforms to the periphery of gripping roller 40 as shown in FIG. 5. Blade holder 56 and blade 58 are positioned in close proximity to gripping roller 40 so that a pinch point is created by the clockwise movement of gripping roller 40 into leading edge 68 of holder 56.

Figure 8:
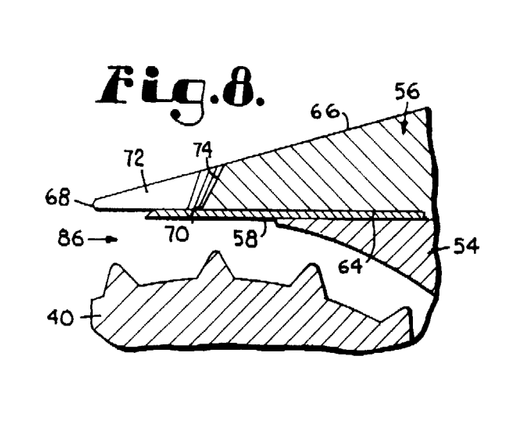
FIG. 8 is a view similar to FIG. 7 showing the blade in an alternative bevel up position.

Blade 58 can be positioned in two different orientations. In FIGS. 5, 8 and 9, blade 58 is shown in its bevel up orientation. This orientation is used to separate skin 80 from the muscle 82 of a product 84 while maintaining any subcutaneous fat on the muscle. With reference to FIG. 9, skin removal is accomplished when an unskinned product 84 is oriented with skin down and brought into contact with rotating gripping roller 40. In close proximity to the pinch point 86 (shown in FIG. 8), skin 80 is pinched between holder 56 and gripping roller 40 and the resultant forces pull the product into blade holder 56 and blade 58. As the product is pulled into edge 60 of blade 58, the cutting action of blade 58 separates skin 80 from the muscle and fat 82. The protective leading edge 68 of blade holder 56 prevents product muscle 82 from being cut or damaged by shielding the muscle from coming into contact with sharp edge 60. After skin 80 is removed, the skinned product 82 is propelled by transport mechanism 38 over the top of blade holder 56 and separated skin 80 is pulled between gripping roller 40 and shoe 54 and is thereafter discharged.

Figures 10, 13, 14, 15, 16, 17:
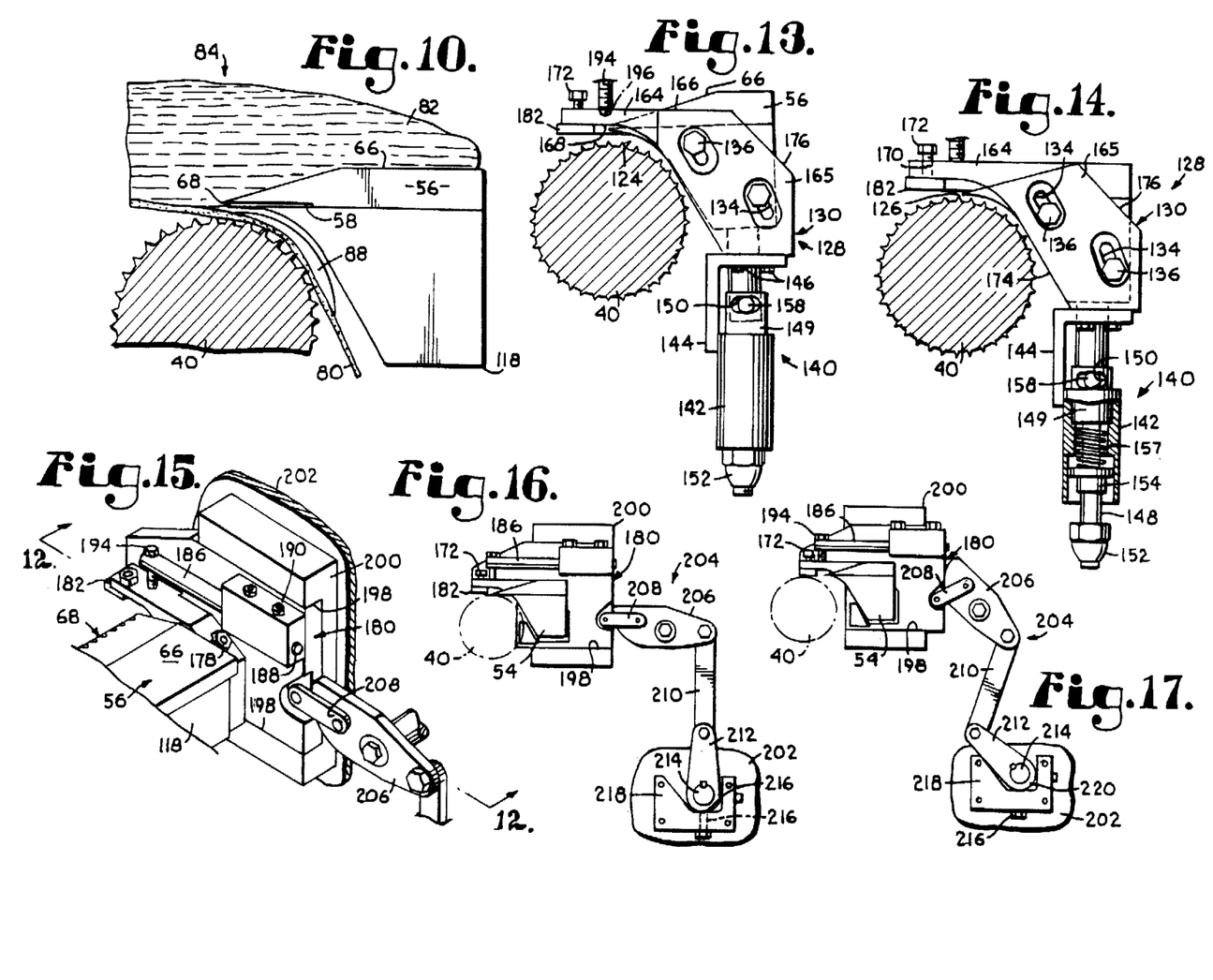
FIG. 10 is a view similar to FIG. 7 but showing the blade in the bevel down position such that both the fat and skin are separated from the muscle.
FIG. 13 is a side elevational view of the pressure shoe assembly of FIG. 3 showing the pressure shoe in its initial open position such that skin will be trapped between the pressure shoe and the gripping roller.
FIG. 14 is a view similar to FIG. 13 showing the pressure shoe in its skinning position after the skin of the product has been pinched between the pressure shoe and the gripping roller.
FIG. 15 is a fragmentary, top perspective view showing the assembled structures for mounting the pressure shoe to the machine frame.
FIG. 16 is a side elevational view of the mounting structure shown in FIG. 15 with the pressure shoe in its skinning position.
FIG. 17 is a view similar to FIG. 16 showing the pressure shoe in its cleaning position wherein the pressure shoe is retracted from the gripping roller.

The second alternative position for blade 58 is in the bevel down orientation shown in FIGS. 7 and 10. This orientation is configured to separate the skin and subcutaneous fat from the muscle utilizing a pulling action. Edge 60 of blade 58 is again recessed behind leading edge 68 of blade holder 56. Therefore, sharp edge 60 of blade 58 is not functional for the purpose of separating the skin from the product. When blade 58 is in this configuration, leading edge 68 of holder 56 becomes the effective separation point. Skin removal is accomplished by orienting the unskinned product skin down and bringing it into contact with the rotating gripping roller 40 in close proximity to pinch point 86 (shown in FIG. 7). Again, the skin is pinched between holder 56 and gripping roller 40, and the resultant forces pull the product into blade holder 56. Since there are no sharp leading edge 68, skin 80 cannot be cut from muscle 82 and must be pulled or ripped off. Since the leading edge 68, skin 80 cannot be cut from muscle 82 and must be pulled or ripped off. Since the subcutaneous fat in most products is tightly attached to skin 80, fat tissues 88 are removed from muscle 82 along with skin 80. Again, as described above, once the skin and fat is pulled away from muscle 12, it is pulled between shoe 54 and gripping roller 40 and then discharged. Transport mechanism 38 is then used to propel the skinned product over holder 56.

In prior art devices, if a pulling action was necessary to remove subcutaneous fat along with the skin, the blade which projected outwardly from the holder was pre-dulled or removed completely to satisfactorily complete the objective. However, some products, such as poultry, have very strong fibrous connective tissues holding the skin onto the muscle. The fibers are often too small to be pinched between the pressure shoe and the gripping roller. Since there were no sharp edges associated with these prior art structures to sever these tissues, the product tended to jam the mechanism. As described above and as shown in FIGS. 7 and 10, edge 60 of blade 58 is exposed only inside indentations 72 in blade holder 56. Thus, any fibrous connective tissues are channeled into indentations 72 where they are severed by sharp edge 60. This severing action is accomplished without allowing muscle 82 to come into contact with any sharp edges where damage or marring of the muscle could occur.

As is apparent, although indentations 72 are shown as being generally semicircular in shape, other suitable shapes can be used so long as they provide a channeling of the connective tissues. For example, a sawtooth configuration of indentations could also be used.

Figures 6, 11, 12:
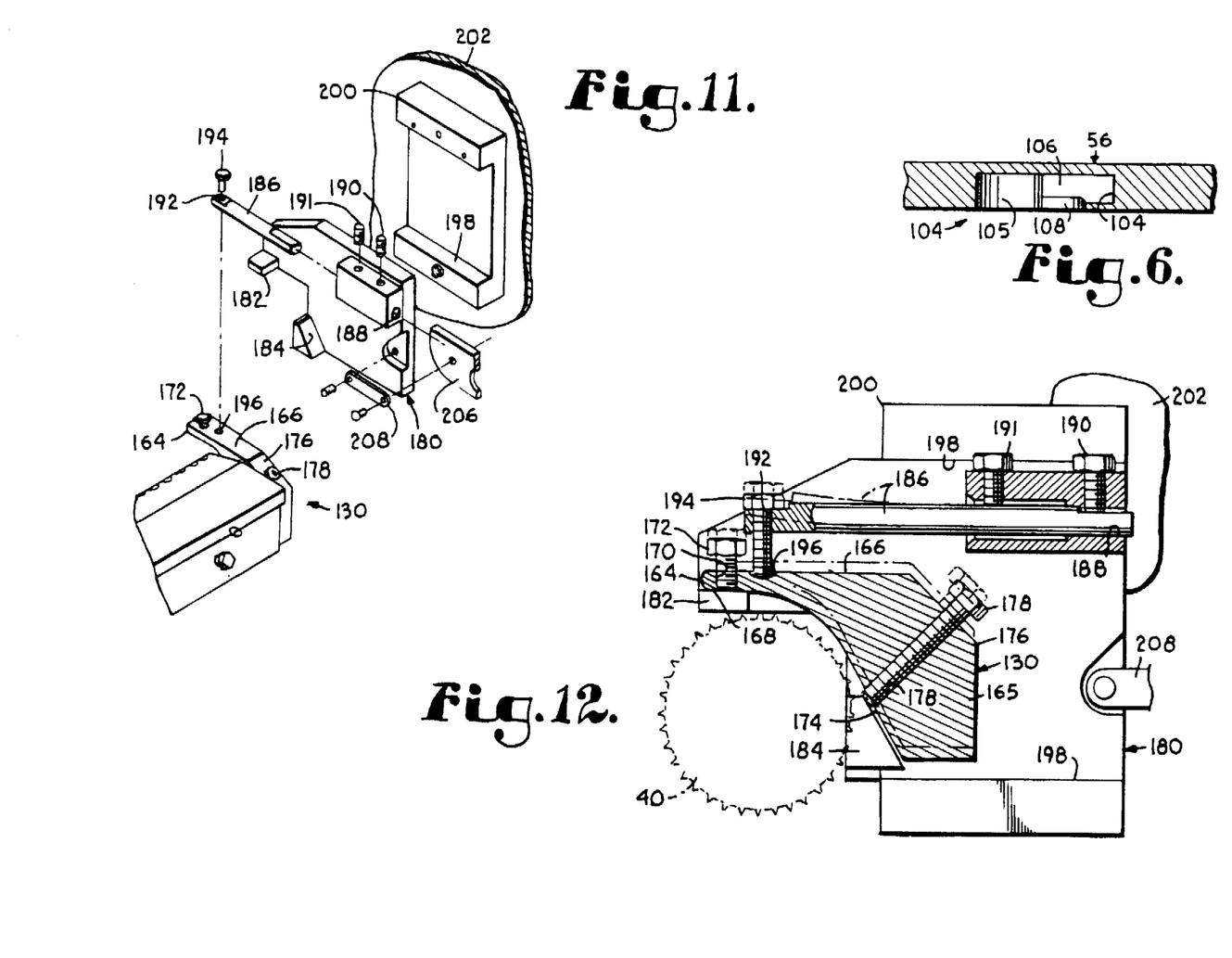
FIG. 6 is a fragmentary enlarged, detailed cross-sectional view taken generally along line 6—6 of FIG. 3 showing the structure of one attaching void.
FIG. 11 is a fragmentary exploded perspective view of the structures used to mount one side of the pressure shoe to the frame of the skinning machine.
FIG. 12 is a view taken generally along line 12—12 of FIG. 15 showing the assembled pressure shoe mounting structures, a floating position of the pressure shoe shown in phantom lines.

Blade holder 56 is attached to pressure shoe 54 by the interaction of locking pins 90 and locking bolts 92 as best shown in FIGS. 3 and 5. Each pin 90 has a generally semi-spherical oversized head 94 separated from an elongated body 96 by a reduced diameter neck 98. Each pin 96 also has a rim 100 formed at an intermediate section. The peripheral surface of body 96 slopes inwardly toward neck 98 and also slopes inwardly toward the bottom of body 96. Each pin also has a securing aperture 102 formed generally below rim 100. Holder 56 has a plurality of attaching voids 104 formed along its lower surface 70 as best shown in FIGS. 3, 4, 5 and 6. More specifically, each attaching void 104 has a generally cylindrical recess 105 which corresponds generally to the size of head 94 of a locking pin 90. Extending outwardly from one side of each recess is a channel 106. Channel 106 has a slot 108 connecting the channel to lower surface 70 as best shown in FIG. 6. Channel 106 generally has the hemispherical shape of head 94 as best shown in FIG. 5. Recess 105 and channel 106 do not spatially connect to upper surface 66 of blade holder 56. Therefore, upper surface 66 is generally smooth with no cracks or crevices formed thereon which could harbor deposits of product and thus potentially cause contamination of subsequently processed product conveyed over holder 56. Pins 90 are secured to holder 56 by first inserting head 94 of the pin into recess 105 and then sliding the head over into channel 106 such that neck 98 is received within slot 108.

After pins 90 have been positioned in voids 104, the combined pins and holder are attached to shoe 54 by inserting the exposed portion of pins 90 into the angled attaching bores 112 opening to the shoe upper surface 114. Locking bolts 92 are then inserted into tapped securing bores 116 which are in spatial communication with bore 112 on one end and shoe rear surface 118 on the other end. As each bolt 92 is screwed into its respective bore 116, the lower end of each bolt contacts the bottom of the securing aperture 102 formed in the respective pin 90. By continuing to thread bolts 92 into shoe 54, pins 90 are forced downwardly and forwardly. The hemispherical machining of channel 106 in blade holder 56 and the hemispherical shape of head 94 of pin 90 allows each pin 90 to rotate until cylindrical rim 100 contacts the wall of angled mounting bore 112. As bolts 92 are threaded further into shoe 54, they continue to force pins 90 downwardly and also cause pinheads 94 to rotate rearwardly forcing the blade holder 56 rearwardly. This rearward motion of blade holder 56 continues until the necks 98 of pins 90 contact the rear edge of their respective mounting holes 112 or the rear surface of holder 56 contacts the head of an adjustment screw 120 disposed in a tapped adjusted bore 122 formed on rear surface 118 of shoe 54. Adjusting screws 120 can be used to adjust the exact position of edge 60 of blade 58 with respect to gripping roller 40. More specifically, screws 120 can be used to moved blade holder 56 and thus blade 58 forward to a desired location. Screws 120 have very fine threads for this fine tuning adjustment. After the holder and blade have been moved to the desired location, as is apparent, tightening of locking bolts 92 will secure holder 56 and blade 58 in the exact desired location.

SHOE LOADING MECHANISM

With reference to FIGS. 3, 13 and 14, a shoe-loading mechanism for allowing the shoe to have an initial opening clearance 124 (FIG. 13) to trap the skin of the product thereunder and thereafter to move the shoe 54 to a skinning clearance 126 (FIG. 14) is now described. Each mechanism 128 includes an end mounting plate 130 which is positioned in a floating arrangement with the rest of the skinning machine as will be more fully described below. Each mounting plate 130 is utilized in conjunction with an end surface 132 of shoe 54. Each plate 130 has a pair of camming slots 134 formed therein. Shoulder bolts 136 are slidably received in slots 134 and are attached to the respective end surface 132 via tapped apertures 138. Thus, as shown in FIGS. 13 and 14, when each mounting plate 130 is positioned in its mounting arrangement to the rest of the machine, shoe 54 can be moved between an initial position (FIG. 13) providing a wider clearance 124 for ensuring that the skin of the product is grasped between gripping roller 40 and shoe 54, and a skinning clearance 126 (FIG. 14) wherein the shoe can operably skin the product. Spring-loading mechanisms 140 are used to bias shoe 54 to its initial position as shown in FIG. 13. Thereafter, after the skin of the product is trapped between shoe 54 and gripping roller 40, the pressure of the product on upper surface 66 of holder 56 moves shoe 54 to its skinning position (FIG. 14) against the bias of spring mechanisms 140. As is apparent, after the product is no longer disposed on upper surface 66, shoe 54 will return to its initial position because of the spring bias of mechanisms 140.

Each mechanism 140 includes a cylinder 142 rigidly secured to its respective mounting plate 130 via a bracket 144 and screws 146. Positioned within the central bore of each cylinder 142 is a plunger 148. Plunger 148 has an upper oversized end 149 which has a pivot slot 150. The lower end of plunger 148 is threaded and has an adjusting nut 152 disposed thereon. Further, disposed in each bore of each cylinder 142 is a spring-tensioning nut 154. Spring-tensioning nut 154 engages threads on the inner bore surface of each cylinder. A spring 157 is disposed around each plunger 148 between plunger head 149 and spring-retaining nut 154. A pivot link 158 is attached to each end of shoe 54 via a bracket 160 and bolts 162. Each pivot link 158 is engaged with the pivot slot 150 of the associated plunger 148. Springs 157 are in compression when disposed in cylinders 142 such that, as shown in FIG. 13, the spring will expand and maintain shoe 54 in its initial position. As skin of product is engaged in the initial position and the muscle of the product is moved along upper surface 66 of blade holder 56, the pressure associated with the product on top of the holder overcomes the compression in springs 157 and further compresses them as shown in FIG. 14 until shoe 54 reaches its skinning position. As is apparent, tensioning nuts 154 can be used to adjust the tension in springs 157 and adjusting nuts 152 can be used to adjust the initial clearance of the shoe.

In the skinning of some types of meats, it may not be necessary to have the initial clearance which is then changed to a skinning clearance. Thus, if such products are being skinned, it may be desirable just to rigidly secure end plates 130 to the ends of shoe 54 such that there is no camming action or sliding action at all between plates 130 and shoe 54. As is apparent, if this is the case, there is no reason to have spring mechanisms 140.

FLOATING MOUNT OF SHOE ASSEMBLY

As described above, each end of pressure shoe 54 has an end mounting plate 130 attached thereto. Each mounting plate 130 has an arm 164 extending forwardly from a body portion 165 as best shown in FIGS. 11, 12 and 15. Each arm 164 has a generally horizontal upper surface 166 and a generally horizontal lower surface 168. Arm 164 has a threaded adjusting aperture 170 formed therein into which is received an adjusting bolt 172. Each body 165 has an angular abutting surface 174 and a generally angular rear surface 176. A threaded adjusting aperture 178 extends from rear surface 176 to abutting surface 174 and an adjusting bolt 178 is threadably received therein. Each plate 130 is secured to a slide mounting block 180 in the following manner. Each block 180 has a generally horizontal support ledge 182 extending a small distance inwardly therefrom. Each block 180 also has an angular support ledge 184 extending inwardly therefrom. With reference to FIG. 12, lower surface 168 of arm 164 generally engages or rests on support ledge 182 and abutting surface 174 of body 165 generally rests on and abuts angular support ledge 184. In this manner, shoe 54 is positioned in its operative arrangement with respect to gripping roller 40.

Each block 180 also has a forwardly extending radial spring 186 mounted in a forward facing bore 188. Spring 186 is held in place in bore 188 by tightening screw 190. Screw 191 can be used to appropriately tension spring 186. The forward end of spring 186 has a threaded adjusting aperture 192 formed therein. An adjusting bolt 194 is threadably disposed in aperture 192. The bottom end of bolt 194 has a spherically machine node which is received in a detent 196 formed in upper surface 166 of arm 164. As is apparent, the contact of bolt 194 with upper surface 166, the contact of lower surface 168 of arm 164 with ledge 182, and the contact of abutting surface 174 with angular support ledge 184 serves to provide a triangular vector which holds pressure shoe 54 in its operating position with respect to gripping roller 40.

As product is skinned utilizing shoe 54, there may be instances where uneven and uncharacteristically thick portions of skin pass between gripping roller 40 and shoe 54. In such instances, shoe 54 on either end can deflect upwardly against springs 186. In this manner, shoe 54 can in a sense float above ledges 182 and 184, depending upon the size of skin flowing between the shoe and the gripping roller (as shown in phantom lines in FIG. 12). Thus, more even skinning can be obtained and machine-clogging jams can be prevented. Because radial springs 186 are disposed on each end, the shoe can adjust side to side also. More specifically, if a thick piece of skin only goes through on one side of the cutting shoe, that is the only side that will float up from its resting position. Therefore, shoe 54 can float or correct in a side-to-side manner and in a front-to-back manner. This is in contrast to conventional spring mechanisms which allow very limited front-to-back motion and do not allow side-to-side motion.

Radial springs are preferably made of corrosive-resistant spring steel such as steel alloy or titanium. The angle of blade 58 to the horizontal plane can be adjusted by turning rear adjustment bolt 178 such that the lower end of the bolt engages support ledge 184. As is apparent, the larger the extent of bolt 178 that extends from surface 174, the greater the angle at which blade 58 will cut. The operational clearance between blade 58 and gripping roller 40 is obtained by turning the front adjustment bolt 172 against support ledge 182 until the desired clearance between the blade and the gripping roller is obtained. As indicated above, the tension of spring 186 is adjusted by turning adjusting screw 191 until the desired tension is obtained.

QUICK RELEASE MECHANISM

During normal skinning operations the clearance between blade 58 and gripping roller 40 is a few thousandths of an inch. To properly sanitize the machine and/or remove jams, it is necessary to temporarily move the shoe assembly away from gripping roller 40 to expose the desired components. To accomplish this, each sliding block 180 is received in a generally rectangular channel 198 of a mounting or guide block 200 as best shown in FIGS. 11, 12 and 15. Mounting blocks 200 are firmly secured on opposite sides of and to the mainframe 202 of the machine. Each channel 198 is machined to tightly receive its respective slide block 180 to only allow horizontal sliding motion of the block in the channel. More specifically, each channel 198 has flat straight upper and lower edges which tightly, but slidingly engage the flat straight upper and lower edges of the respective slide block 180. Therefore, vertical and radial movement of each slide block 180 is prevented. As is apparent, by blocks 180 sliding within channels 198, as shown in FIGS. 16 and 17, shoe 54 can be removed from its operating position with respect to gripping roller 40 to allow cleaning and/or repairs or maintenance on the parts. Shoe 54 is moved between its operative position and its cleaning position shown in FIGS. 16 and 17, respectively, by a mechanism 204. Mechanism 204 includes a pair of cams 206 pivotally mounted to the mainframe 202 of the skinning machine. Each cam 206 is associated with one of slide blocks 180 such that if cam 206 is rotated in a counterclockwise direction, as shown in FIG. 16, the shoe 54 is moved to an operative position. When shoe 54 is in its operative position, backward movement of slide blocks 180 is restricted by the face of cams 206. Each cam 206 is also pivotally connected to its respective sliding block 180 by a pivot link 208. Thus, as cams 206 are pivoted in a clockwise direction, as shown in FIG. 17, away from gripping roller 40, slide blocks 180 are also horizontally moved rearwardly within channels 198 to the cleaning position. Radial movement of cams 206 are prevented by the rigid positioning of connecting 210 bars in relation to pivot arms 212 which are disposed on a horizontally extending pivot shaft 214. Radial movement of each pivot arm 212 is restricted by an associate spring detent 216 threaded into the bottom of an associated pivot block 218, which is firmly bolted to the frame of the skinning machine. Each spring detent 216 engages a small detent 220 located on the lower surface of its associated arm 212 such that, when arm 212 is in a directly vertical position, it is maintained in such position by the detent.

Shaft 214 spans the entire width of the unit through both of the pivot arms 212 and has at least one handle 222 disposed on its end, as best shown in FIG. 1. Pivot blocks 218 are machined so that arms 212 can only rotate in the forwardly direction. In order to move the shoe 54 to its cleaning position, a user exerts pressure on handle 222 such that spring detents 216 are disengaged from detents 220. Further radial movement of arms 212 forwardly pulls connecting bars 210 downwardly and forwardly, which pulls the rear of cams 206 down causing them to rotate around their pivots. As cams 206 rotate, the upward movement of the face of the cams exerts a backwardly and upwardly force on links 208 which pulls slide blocks 180 rearwardly. Since vertical movement of slide blocks 180 is restricted by channels 198 in mounting blocks 200, the only direction in which sliding blocks 180 can move is horizontally. Since the components of the skinning machine are retained by sliding blocks 180, all the components move horizontally away from gripping roller 40. At full rotation of pivot arms 212, the skinning mechanisms can be easily cleaned or dejammed.

To return shoe 54 to its operating position, handle 222 is actuated radially rearwardly until spring detents 216 engage detents 220 on arms 212. In this manner, shoe 54 can be returned to its exact operating position. Further, at no time during this quick release operation does radial springs 186 change or does the originally set clearance of the device in its operating condition change.

OVERHEAD TRANSPORT MECHANISM

Figure 18:
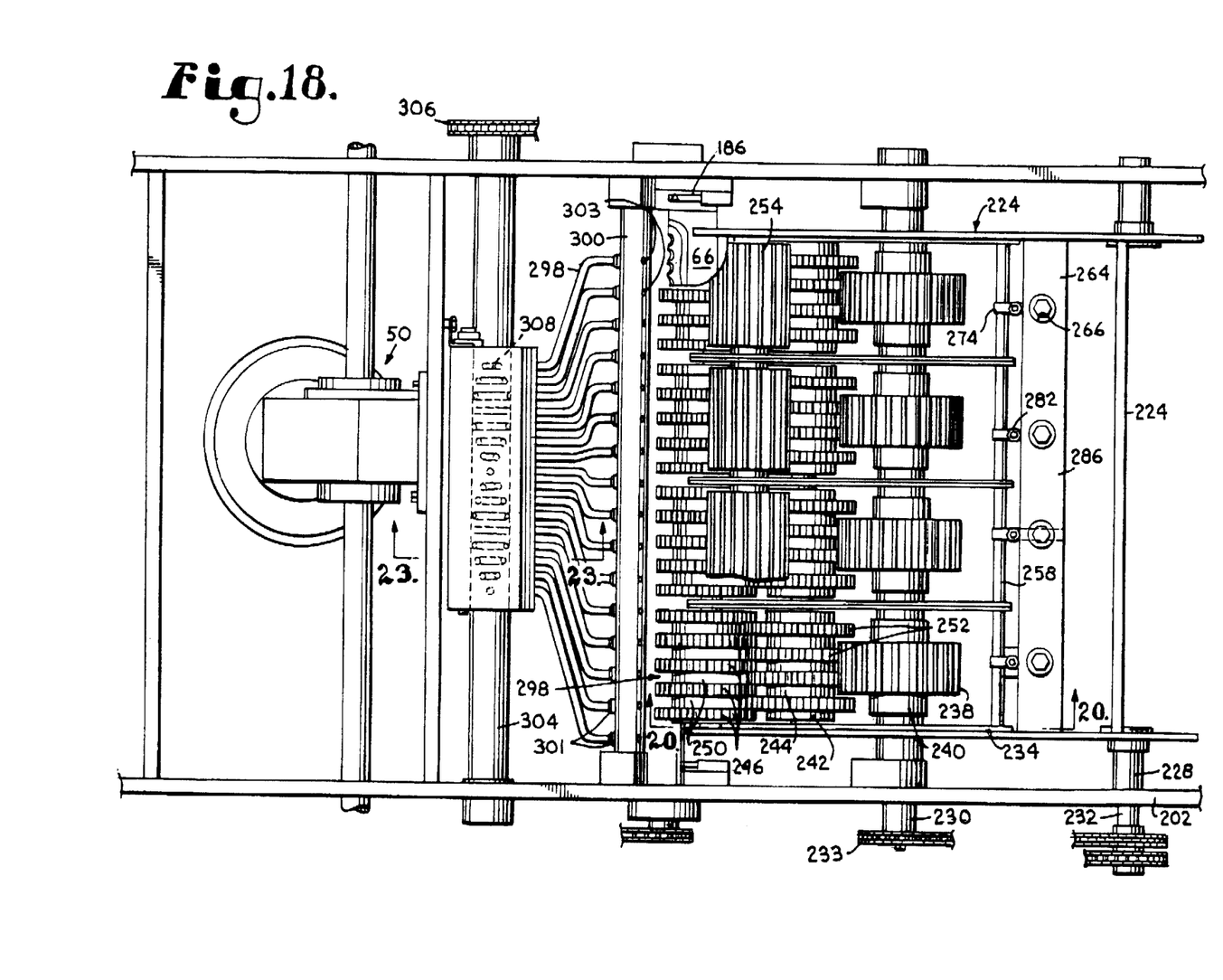
FIG. 18 is a top plan view of the skinning machine, parts being broken away and shown in cross section to reveal details of construction.

As best shown in FIGS. 18–21, overhead transport mechanism assembly 38 has a box frame 224 which holds a plurality of tractor units 226. Box frame 224 is pivotally mounted to machine frame 202 through a pivot arrangement 228. As shown in FIG. 2, because of the pivot arrangement 228, box 224 with units 226 therein can be pivoted upward as indicated in phantom lines in FIG. 2 such that they are no longer disposed above pressure shoe 54 and gripping roller 40. In this manner, easy access can be gained to the skinning mechanisms of the skinning machine. Each unit 226 is pivotally mounted about a driven shaft 230 via bushings 236. Shaft 230 is driven via a suitable drive shaft 232 which is generally in line with pivot arrangement 228. A chain 233 can be used between shaft 232 and 230 to drive shaft 230, as best shown in FIG. 18. Each unit 226 includes a frame 234 which maintains and pivotally supports various gears. Each frame 234 is pivotally mounted about shaft 230 via suitable bushings 236 such that frames 234 can pivot about the rotating shaft 230, but are not driven thereby. However, each unit 226 does have a drive gear 238 which is fixedly attached to rotating shaft 230 via a sleeve 240 and a setscrew (not shown). Drive gear 238 is in turn meshed with the gear teeth of a follower gear 242, as best shown in FIGS. 2 and 18. Follower gear 242 has a plurality of reduced diameter sections 244 which do not have gear teeth, as best shown in FIG. 18. Sections 244 generally receive therein teeth sections 246 of feed gear 248. Feed gear 248 also has a plurality of unteethed reduced diameter sections 250 into which teeth sections 252 of follower gear 242 are disposed. Thus, as is apparent, the teeth sections 246 and 252 of feed gear 248 and follower gear 242, respectively, never engage one another. However, feed gear 248 is driven by use of idler gear 254 which has teeth that mesh with the teeth sections of both follower gear 242 and feed gear 248. Thus, drive gear 238 drives follower gear 242 which in turn drives idler gear 254, which in turn drives feed gear 248, as is best shown in FIGS. 2 and 18. With reference to FIGS. 19–21, gears 242, 248 and 254 are all suitably mounted to frame 234 via pin arrangements 256. With reference to FIGS. 20 and 21 each unit 226 can pivot individually about driven shaft 230. More particularly, the forward portion of each frame 234 is where gears 242 and 248 are located. On the rearward portion of frame 234 behind shaft 230 there is a generally cylindrical horizontally disposed follower 258. Each follower 258 is disposed in a slot 260 of a spring-biasing mechanism 262 attached to a horizontally extending bar 264 extending across box 224. Bar 264 has a plurality of vertically disposed bores 266 formed therein. Each bore 266 has an aperture 268 opening up to the lower surface of the bar. Within each aperture 268 is disposed a spindle 270 of one of mechanisms 262 as best shown in FIGS. 20 and 21. Spindles 270 are in turn attached to horizontal base plates 272 of mechanisms 262. Vertically extending members 274 having slots 260 therein also extend upwardly from base plates 272 but on the forward side of bar 264. Attached to the top of each spindle 270 is an adjusting nut 276 and a generally cylindrical spring adjusting washer 278. Positioned between each washer 278 and the bottom of each bore 264 is a coil spring 280. Each spring 280 is under compression such that it biases feed gear 248 and follow gear 242 towards shoe 54 and gripping roller 40. As product passes over shoe 54 and roller 40 each individual unit 26 can be pivoted in a generally clockwise direction as shown in FIG. 21. As this happens, spring 280 is further compressed. Once product is no longer between shoe 54 and gears 248 and 242, the unit will be pivoted to its initial position by the spring bias. As shown in FIG. 20, the initial position of gears 248 and 242 above shoe 54 can be set by use of adjusting screws 282 which are positioned on an upper plate or cover 286 of bar 264.

In use, product 84 enters skin down into shoe 54 and gripping roller 40 via an in-feed conveyor. The function of feed gear 248 is to guide product 84 into contact with gripping roller 40 and apply sufficient pressure to the product to ensure that the skin of product 84 is inserted under blade holder 56 and cutting blade 58. The rotation of gripping roller 40 and the pinch point pressure pulls product 84 forwardly until it contacts follower gear 242. Follower gear 242 pulls the product through the mechanism and discharges the product onto an out-feed conveyor which evacuates the product from the unit.

When processing products with tender flesh or partial skin cover, the pressure P1 (shown in FIG. 20) on feed gear 248 must be set as small as possible to prevent damage to the product. However, the pressure P2 exerted by the follower gear 242 must be set higher to ensure that the product is effectively evacuated from the skinning shoe 54. Units 226 are so designed that pressure P2 associated with follower gear 242 is greater than pressure P1 associated with feed gear 248. More specifically, the fulcrum distance R1 from feed gear 248 to the pivot point about shaft 230 is greater than the fulcrum distance R2 from follower gear 242 to the pivot point as shown in FIG. 20. As a result of these fulcrum distances, the pressure P2 will be greater than the pressure P1.

The provision of follower gear 242 is crucial for the operation of the machine. It ensures that product is adequately evacuated from above the skinning mechanisms. Further, the individual operation of each unit 226 allows versatile operation of the skinning machine. More specifically, product of different heights and size can move across the skinning mechanisms and each of the individual units can adjust accordingly to the size and height of the product.

Gears 238, 242, 248, and 254 are all preferably made of food grade plastic urethane. It is preferable to have feed gear 248 made of a more pliable material then follower gear 242.

CLEANING MECHANISM

Figures 22, 23, 24, 25:
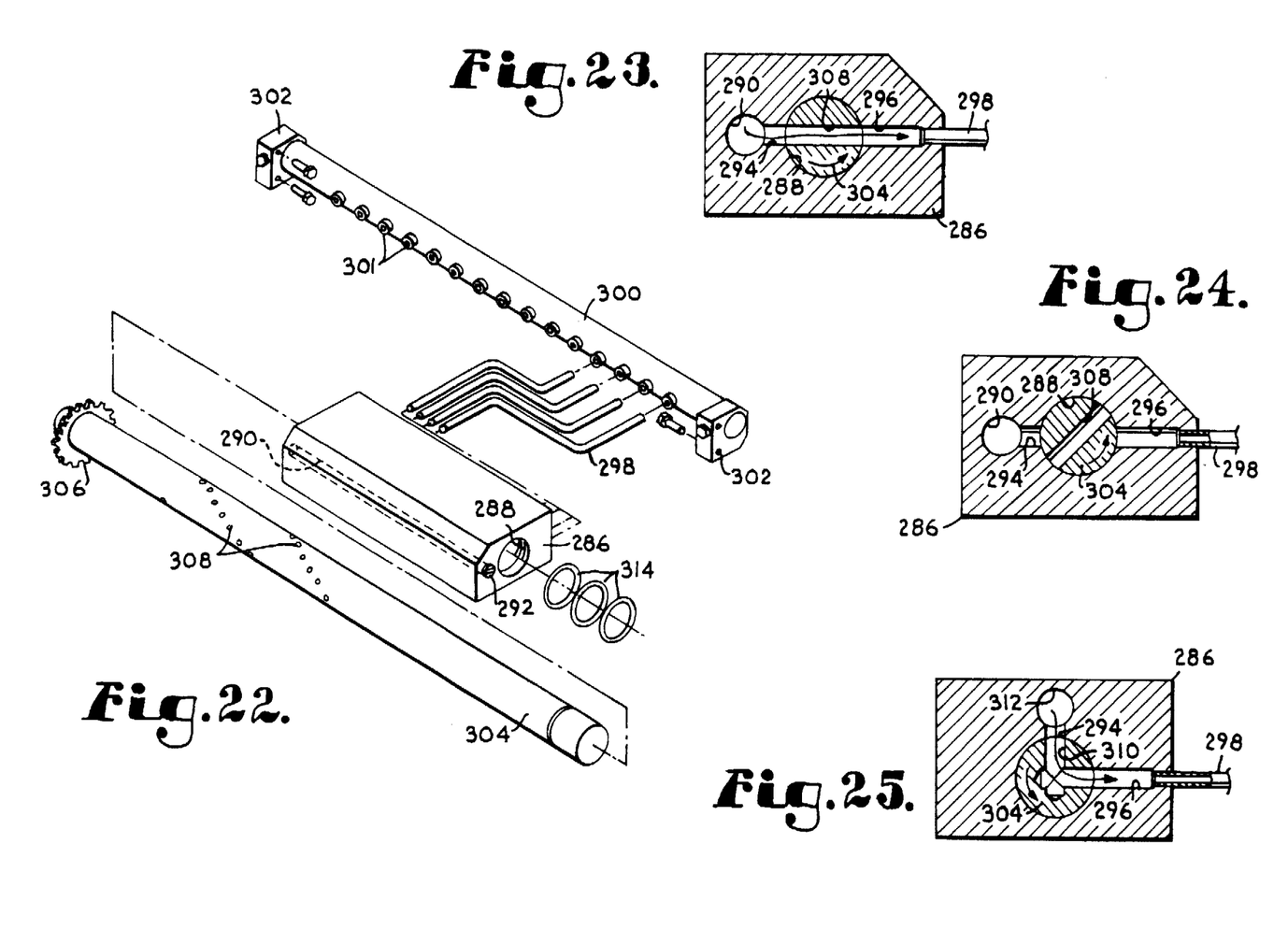
FIG. 22 is an exploded perspective view of the cleaning mechanism according to the present invention.
FIG. 23 is a cross-sectional view taken generally along line 23—23 of FIG. 18 and showing the cleaning mechanism with the roller allowing fluid to flow from the reservoir into the discharge ports to supply fluid to clean the gripping roller.
FIG. 24 is a view similar to FIG. 23 but showing the flow of fluid to the discharge port being blocked.
FIG. 25 is an alternative embodiment for the roller of the cleaning mechanism showing fluid being discharged from the fluid reservoir to the discharge port.

With reference to FIGS. 2, 18 and 22–25, the cleaning mechanism of the present invention will be described. As shown in FIG. 2, skin that has been removed from product is propelled by gripping roller 40 downwardly as indicated by the arrow c. However, some skin may remain on the teeth of gripping roller 40. Stripping roller 48 is rotated in the opposite direction to gripping roller 40. The teeth of roller 40 and roller 48 are in close proximity such that some of the skin remaining on gripping roller 48 will be removed therefrom by the teeth of stripping roller 48. Any residue that remains on gripping roller 48 thereafter will be removed by cleaning mechanism 50. Mechanism 50 includes a manifold 286 which has a longitudinally extending bore 288. Manifold 286 also includes a longitudinally extending cleaning media reservoir 290. The cleaning media used to clean roller 40 can be any suitable fluid, for instance, air or water. Reservoir 290 is capped on one end by a cap 292 and is connected to a supply of cleaning media on the other end (not shown). Reservoir 290 is in spatial communication with bore 288 through a plurality of spaced inlet passages 294. Inlet passages are aligned with outlet passages 296 on the other side of bore 288. Each outlet passage is connected to one end of a flexible conveying tube 298. The other end of each tube 298 is connected to a coupler 301 on a elongated generally cylindrical nozzle bar 300. Bar 300 has the inlet couplings 301 on one side which are connected to tubes 298 and a plurality of nozzles 303 associated with each tube on the other side which generally face gripping roller 40. Bar 300 can be rotated in mounting blocks 302 such that the angle of nozzles 303 facing the gripping roller can be changed if desired. Elongated roller 304 is disposed in bore 288. Roller 304 is driven by a suitable drive means connected to gear 306 on the end of roller 304. Roller 304 has a plurality of diametrically extending passages 308 spaced about is periphery. Each passage 308, when roller 304 is mounted in bore 288, generally aligns in a vertical plane with one of the inlet and outlet passages 294 and 296 of manifold 286. Therefore, as best shown in FIGS. 23 and 24, with each revolution of the roller, each of the passages 308 will twice align with their respective inlet and outlet passages to allow the flow of cleaning media from reservoir 290 into tubes 298 and thus to be discharged through the appropriate nozzle on bar 300. As shown in FIG. 24, when passages 308 are not in a firing position, the flow of cleaning media from the respective inlet passage to the outlet passage is prevented. A plurality of O-rings 314 or other suitable sealing devices can be used in bore 288 to seal adjacent inlet and outlet passages from one another to prevent fluid leakage when a nozzle is not being fired. By having the plurality of passages 308 spaced along the periphery of roller 304, a sequential firing of blasts of cleaning media through tubes 298 can be accomplished. Therefore, a sequential firing from the nozzle located on the furthest left of bar 300 to the nozzle located on the right side of bar 300 can be accomplished. This sequential burst of fluid running across gripping roller 40 serves to peel any skin residue that may be remaining on the roller. As is apparent, passages 308 can be arranged in a variety of fashions to allow a variety of different firing sequences for the fluid discharge mechanism. Further, with reference to FIG. 25, an L-shaped passage 310 can be utilized with a differently disposed fluid reservoir 312 such that fluid is discharged through each of the discharge passages only one time per revolution. More specifically, as shown in FIG. 25, fluid will go from reservoir 312 to outlet passage 296 only once during the rotation of roller 304 due to the L-shaped nature of passage 310.

This cleaning system offers great advantages over the fluid cleaning systems of prior art structures. More specifically, it allows a simple mechanism for achieving a sequential firing of bursts of cleaning media across the gripping roller to obtain a peeling type cleaning action. Further, through the use of bar 300 and flexible tubes 298, the fluid generating structures can be disposed away from the confined areas surrounding the skinning mechanisms. Further, bar 300 allows easy adjustment of the angle of the cleaning media flowing from the nozzles therein.

Although the above structures of manifold 286 and roller 304 are described in the context of a cleaning mechanism for a skinning machine, it is apparent that the structures could be used to clean any type of device wherein it is desirable to provide a particular pattern of cleaning fluid. Further, these structures are not limited to cleaning systems, but can be used as a mixing system or an exhaust system, or a combination of both at the same time. The system is bi-directional and can be distributive or recombinative. For instance, the structure of manifold 286 and roller 304 with its passages therein could be used potentially as a valving system for an automotive engine. Further, the structure of the manifold and the roller could be used to mix different fluids by providing the input of different fluids into the manifold via predetermined reservoirs and input lines. As is apparent, the mixing, valving, exhaust functions capable with a manifold and roller can be adjusted according to particular needs by positioning different types of reservoirs and input structures into the manifold, and further, by adjusting the position, size and orientation of the passages in the roller. All sorts of fluids can be mixed, valved or exhausted with such structures, for instance, cryogenic gases or expanding hot gases can be suitably handled by such a system. Thus, the application of this manifold with a rotating roller structure can be changed to offer a variety of different purposes and functions.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matters herein set forth are shown in the accompanying drawings is to be interpreted as illustrative and not in a limited sense.

I claim:

1. A skinning assembly for a skinning machine, the assembly comprising:

a gripping roller for pulling skin through the skinning assembly;

a blade holder having an elongated body with an upper surface and a lower surface, said upper surface sloping downwardly to form a dull leading edge with said lower surface, said leading edge having a plurality of indentations formed therealong and forming a pinch point with the gripping roller; and a blade positioned adjacent to said blade holder so that a blade cutting edge is recessed behind said leading edge and extends across at least a portion of an indentation.

2. The skinning assembly of claim 1 wherein said blade holder has indentations that are generally semicircular in shape.

3. The skinning assembly of claim 1 wherein said blade holder has indentations are evenly spaced across said leading edge.

4. The skinning assembly of claim 2 wherein each indentation of said blade holder is separated from an adjacent indentation by a straight segment of said leading edge.

5. The skinning assembly of claim 3 wherein said straight segments of said leading edge of said blade holder are rounded so as to present a dull edge.

6. The skinning assembly of claim 6 wherein each indentation of said blade holder has a forwardly facing edge extending between said straight segments and a beveled surface extending from said body upper surface to said forwardly facing edge.

7. A blade holder for a skinning machine, the blade holder configured to hold a blade with a sharp cutting edge and configured to be attached to a cutting shoe by at least one locking pin, the locking pin having an elongated body and an oversized head separated from the body by a reduced diameter neck, the blade holder comprising:

an elongated body having an upper surface and a lower surface, said lower surface of said body having a least one recess formed therein and extending upwardly towards said upper surface, but not extending to said upper surface, said recess having a horizontally extending channel extending to one side, said channel having a slot that connects said channel spatially to said lower surface, the width of said recess and the width of said channel corresponding generally to the width of the head of the locking pin and the width of the slot corresponding generally to the width of the neck of the locking pin, wherein said holder body is configured to be attached to the shoe by positioning the head of the locking pin into said recess and sliding the head into said channel and the neck into said slot so the head is connected to said holder body.

* * * * *

UNITED STATES PATENT AND TRADEMARK OFFICE
CERTIFICATE OF CORRECTION

PATENT NO. : 5,766,066
DATED : June 16, 1998
INVENTOR(S) : Richard L. Ranniger

It is certified that error appears in the above-indentified patent and that said Letters Patent is hereby corrected as shown below:

In claim 3, line 2, after the word "indentations" please insert the word --that--.

In claim 6, line 1, please delete the numeral "6" and insert therefor the numeral --4--.

Signed and Sealed this

Eleventh Day of May, 1999

Attest:

Q. TODD DICKINSON

*Attesting Officer*     Acting Commissioner of Patents and Trademarks